United States Patent [19]

Lannes

[11] Patent Number: 5,660,165

[45] Date of Patent: *Aug. 26, 1997

[54] BACK-UP HEATER

[75] Inventor: Eric M. Lannes, Kentwood, Mich.

[73] Assignee: Bradford White Corporation, Ambler, Pa.

[*] Notice: The portion of the term of this patent subsequent to Dec. 13, 2011, has been disclaimed.

[21] Appl. No.: 254,958

[22] Filed: Jun. 7, 1994

[51] Int. Cl.⁶ .................................................... F24J 2/04
[52] U.S. Cl. .......................... 126/641; 126/610; 122/14; 122/17; 165/70; 165/140; 165/163
[58] Field of Search .................................. 126/609–615, 126/640–643; 122/14, 17; 165/70, 163, 33, 134.1, 180; 248/68.1, 74.1, 74.2, 74.3; 237/19

[56] References Cited

U.S. PATENT DOCUMENTS

| | | |
|---|---|---|
| 1,070,175 | 8/1913 | Ponninghaus . |
| 1,240,101 | 9/1917 | Thompson . |
| 1,255,835 | 2/1918 | Shaug . |
| 1,959,933 | 5/1934 | Simsohn . |
| 2,252,046 | 8/1941 | Steele . |
| 2,255,956 | 9/1941 | Watt . |
| 2,303,197 | 11/1942 | Canfield . |
| 2,327,339 | 8/1943 | Chandler . |
| 2,345,209 | 3/1944 | Moore . |
| 2,348,610 | 5/1944 | Colby . |
| 2,348,835 | 5/1944 | Mueller . |
| 2,359,547 | 10/1944 | Colby . |
| 2,373,731 | 4/1945 | Wilson et al. . |
| 2,399,985 | 5/1946 | Chandler . |
| 2,533,508 | 12/1950 | Riu . |
| 2,539,469 | 1/1951 | Powers . |
| 2,569,757 | 10/1951 | Gubson . |
| 2,642,046 | 6/1953 | Alexander . |
| 2,704,188 | 3/1955 | Bergmann . |
| 3,171,597 | 3/1965 | Baier . |
| 3,201,045 | 8/1965 | Davidson et al. . |
| 3,254,839 | 6/1966 | McClanahan et al. . |
| 3,341,122 | 9/1967 | Whittell, Jr. . |
| 3,492,461 | 1/1970 | Lawrence . |
| 3,527,293 | 9/1970 | Meisse et al. . |
| 3,545,534 | 12/1970 | Coles ............................ 165/163 |
| 3,793,992 | 2/1974 | Marquez . |
| 3,828,847 | 8/1974 | Stein . |
| 3,882,693 | 5/1975 | Hiller . |
| 3,896,992 | 7/1975 | Borovina . |
| 3,958,755 | 5/1976 | Cleer, Jr. . |
| 4,030,540 | 6/1977 | Roma . |
| 4,037,785 | 7/1977 | Madern . |
| 4,052,000 | 10/1977 | Honikman . |

(List continued on next page.)

FOREIGN PATENT DOCUMENTS

| | | |
|---|---|---|
| 71574/87 | 11/1987 | Australia . |
| 2412807 | 8/1979 | France . |
| 2469667 | 5/1981 | France . |
| 24 30 825 | 1/1976 | Germany . |
| 39 06 715 | 9/1990 | Germany . |
| 49760 | 3/1982 | Japan ............................ 126/609 |

*Primary Examiner*—James C. Yeung
*Attorney, Agent, or Firm*—Miller & Christenbury

[57] ABSTRACT

An apparatus for heating a domestic water supply including a glass-lined storage tank to contain the domestic water supply. A combustible fuel burner is positioned to heat the domestic water supply within the glass-lined storage tank. A solar heating tube is connected to supply solar heated fluid to a heat transfer coil mounted within the glass-lined storage tank. The heat transfer coil has a double-wall including a non-metallic outer wall in contact with a metallic inner wall, both walls being sealed to prevent mixing of the domestic water supply with the solar heated fluid. A sensor is positioned to sense the temperature of the solar heated fluid as it is delivered to the heat transfer coil. A controller is connected to the temperature sensor and to the combustible fuel burner to actuate the burner to heat the domestic water supply when the temperature of the solar heated fluid is insufficient to heat the domestic water supply by heat transfer from the solar heated fluid in the heat transfer coil to the domestic water supply in the glass-lined storage tank.

12 Claims, 10 Drawing Sheets

U.S. PATENT DOCUMENTS

| | | | |
|---|---|---|---|
| 4,149,673 | 4/1979 | Hapgood . | |
| 4,158,438 | 6/1979 | Hapgood . | |
| 4,167,211 | 9/1979 | Haller . | |
| 4,193,180 | 3/1980 | Press | 165/180 |
| 4,202,406 | 5/1980 | Avery . | |
| 4,238,873 | 12/1980 | Frank et al. . | |
| 4,253,446 | 3/1981 | Miller . | |
| 4,267,826 | 5/1981 | Hitt, Jr. . | |
| 4,273,160 | 6/1981 | Lowles . | |
| 4,282,861 | 8/1981 | Roark . | |
| 4,296,799 | 10/1981 | Steele . | |
| 4,309,982 | 1/1982 | Oquidam . | |
| 4,328,791 | 5/1982 | Moore, Jr. et al. | 126/610 |
| 4,345,583 | 8/1982 | Morin . | |
| 4,353,410 | 10/1982 | Godard et al. . | |
| 4,426,037 | 1/1984 | Bernstein . | |
| 4,461,347 | 7/1984 | Layton et al. . | |
| 4,480,631 | 11/1984 | Kristensen . | |
| 4,545,365 | 10/1985 | Wetzel, Jr. . | |
| 4,637,347 | 1/1987 | Troy . | |
| 4,738,394 | 4/1988 | Ripka et al. . | |
| 4,821,682 | 4/1989 | Waters . | |
| 4,949,680 | 8/1990 | Kale . | |
| 4,972,902 | 11/1990 | Ninomiya . | |
| 5,037,510 | 8/1991 | Nygards . | |
| 5,136,985 | 8/1992 | Krowech . | |
| 5,178,207 | 1/1993 | Bergqvist et al. . | |
| 5,228,413 | 7/1993 | Tam . | |
| 5,372,185 | 12/1994 | Lannes | 165/70 |

BACK-UP HEATER

BACKGROUND OF THE INVENTION

This invention relates to a back-up heating system for residential or commercial use having a primary heat source and a back-up heat source for domestic water. The primary heat source heats a recirculating fluid supply which transfers heat to domestic water in a storage tank. The back-up heat source heats the domestic water when the primary heat source is insufficient.

FIELD OF THE INVENTION

There has long been a need for a domestic water heating system having a primary heat source such as solar heat and a back-up heat source such as combustible fuel for heating domestic water when the primary heat source is insufficient. Previous attempts to provide such a back-up heating system failed to produce a reliable, efficient, and long-lasting system.

The apparatus disclosed by Wetzel, Jr., in U.S. Pat. No. 4,545,365, is representative of several systems intended to heat domestic water using solar power. The Wetzel, Jr. apparatus used solar energy to heat refrigerant circulated through a conduit. Heated refrigerant passed through a condenser mounted within a water storage tank so that heat from the refrigerant was transferred to the stored water. An auxiliary electric heating coil was provided in the water storage tank to heat the water when solar power was inadequate. Systems like the Wetzel, Jr. apparatus were not adapted for use with glass-lined water heaters and degradation of such systems may lead to mixing of recirculating refrigerant with the domestic water supply.

Prior systems lacked adequate protection against the mixing of domestic water and recirculating fluid supplies. Moreover, prior systems accelerated the decay of the water storage tank, thereby increasing maintenance requirements and reducing cost effectiveness. Prior systems were also inappropriate for use with glass-lined water heaters. For these reasons, prior systems often were not capable of economical or satisfactory use.

Accordingly, there is a long-standing and thus far unsatisfied need for an inexpensive and efficient back-up water heating system utilizing solar power as a primary heat source and a combustible fuel back-up heat source.

OBJECTS OF THE INVENTION

It is an object of this invention to provide a water heating system that overcomes the problems associated with prior systems.

It is another object of this invention to provide a back-up water heating system for residential or commercial use capable of heating water even upon failure of a primary heat source.

It is another object of this invention to provide a back-up water heating system having a back-up heat source for quickly and efficiently heating water upon failure of a primary heat source.

It is another object of this invention to provide a back-up water heating system that utilizes glass-lined water heaters.

It is still another object of this invention to provide a back-up water heating system which prevents the mixing of domestic water and recirculating fluid supplies.

It is a further object of this invention to provide a back-up water heating system without degrading water heater performance or compromising water heater longevity.

It is another object of this invention to provide a back-up water heating system which prevents the exposure of stored water to dissimilar metals and the accelerated corrosion associated therewith.

Finally, it is another object of this invention to provide a back-up water heating system characterized by both low manufacturing and maintenance costs.

Other objects and advantages of the invention will become apparent to those skilled in the art from the drawings, the detailed description of preferred embodiments and the appended claims.

SUMMARY OF THE INVENTION

The back-up water heating system comprises a heat exchanger incorporated into a standard, glass-lined water heater which preferably has a direct-firing burner and a flue to heat domestic water. The heat exchanger is connected to an external recirculating fluid circuit wherein recirculating fluid is heated by an external heat source such as solar power.

The heat exchanger in the water heater has a coiled construction and terminates at the water heater wall, top and/or bottom. The heat exchanger coil passes through and is substantially submerged in the domestic water so that heat is transferred from heated recirculating fluid in the coil to domestic water in the water heater.

The heat exchanger coil has a double-wall construction, having a non-metallic outer wall surrounding a metallic inner wall. The double-wall protects the domestic water supply from contamination by the recirculating fluid. The non-metallic outer wall also permits dielectric mounting of the heat exchanger coil within the glass-lined water heater to prevent the accelerated corrosion which occurs when water is exposed to dissimilar metals. The inner wall's metallic construction provides increased conductive heat transfer and structural strength.

DETAILED DESCRIPTION OF THE INVENTION

The following description is intended to refer to the specific embodiments of this invention that are illustrated in the drawings. This description is not intended to define or limit the scope of the invention, which is defined separately in the claims that follow.

Figure 1:
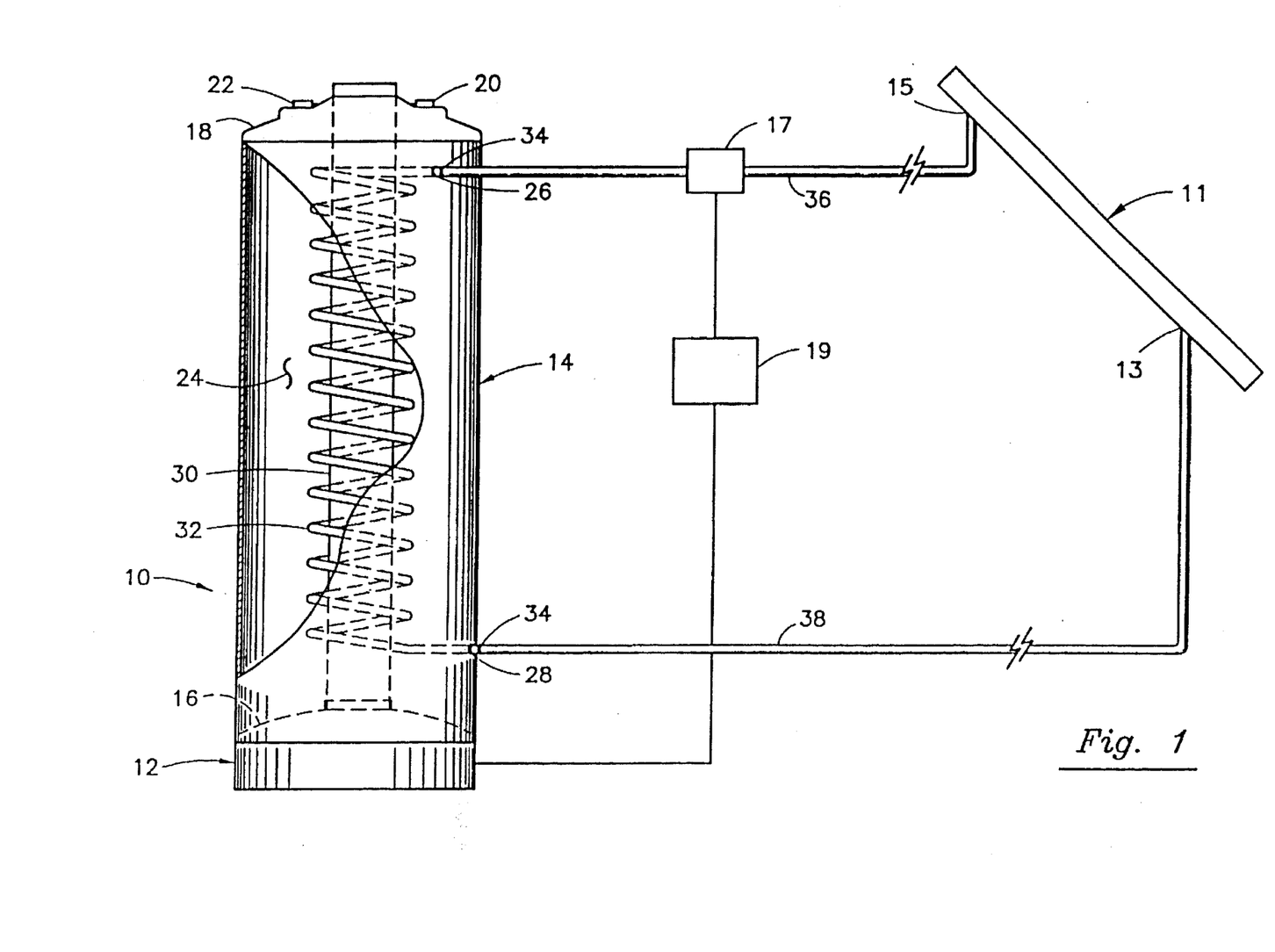
FIG. 1 shows a side view of one embodiment of the back-up water heating system with a portion of the water heater wall removed.

Referring to FIG. 1, the number 10 designates one embodiment of the back-up water heating system. Back-up water heating system 10 has a heat source 12 which heats domestic water contained within a glass-lined water heater 14. Heat source 12 is preferably a direct-fired burner of the type traditionally used in standard water heaters. Although oil, gas or other fuels are contemplated, heat source 12 is most preferably a direct-fired gas burner. Water heater 14 has a bottom 16, a top 18 and a wall 24. Water heater top 18 has a cold water inlet port 20 through which water is introduced into water heater 14. A hot water outlet port 22 is also provided in water heater top 18 so that hot water may be drawn from water heater 14 for consumption. Wall 24 of water heater 14 has a tank inlet port 26 in the top portion of wall 24 and a tank outlet port 28 located toward the bottom of wall 24.

A flue 30 runs between water heater bottom 16 and water heater top 18 to provide exhaust of combustion gases from heat source 12. A coiled heat exchange tube 32 is mounted within water heater 14 so that it surrounds flue 30. Coiled heat exchange tube 32 terminates at a dielectric fitting assembly 34 at tank inlet port 26 and also at a dielectric fitting assembly 34 located at tank outlet port 28. Pipe section 38 runs from dielectric fitting assembly 34 at tank outlet port 28 to a solar heater or heat source 11 at inlet port 13. Pipe section 36 runs from an outlet port 15 of solar heater 11 to water heater 14, terminating at dielectric fitting assembly 34 at tank inlet port 26.

Back-up water heating system 10 also has a temperature sensor 17 located along pipe section 36 near tank inlet port 26. Temperature sensor 17 is of any known variety capable of sensing the temperature of recirculating fluid within pipe section 36 as the recirculating fluid approaches or enters water heater 14 through inlet port 26. Temperature sensor 17 is electrically connected to a water heater controller 19 which is in turn electrically connected to heat source 12. Water heater controller 19 is calibrated to actuate heat source 12 when the temperature sensed by temperature sensor 17 falls below a predetermined value as described below.

Back-up water heating system 10 shown in FIG. 1 utilizes a direct-fired gas burner for heat source 12 to heat domestic water in the storage tank when solar heat is insufficient. However, an electric or other water heating system can also be used. An electric system would have one or more heating elements extending into the water storage tank, eliminating the need for the direct-fired burner or combustion gas flue of direct-fired water heaters. Such an electric water heating system is described below with reference to FIG. 12.

Figure 2:
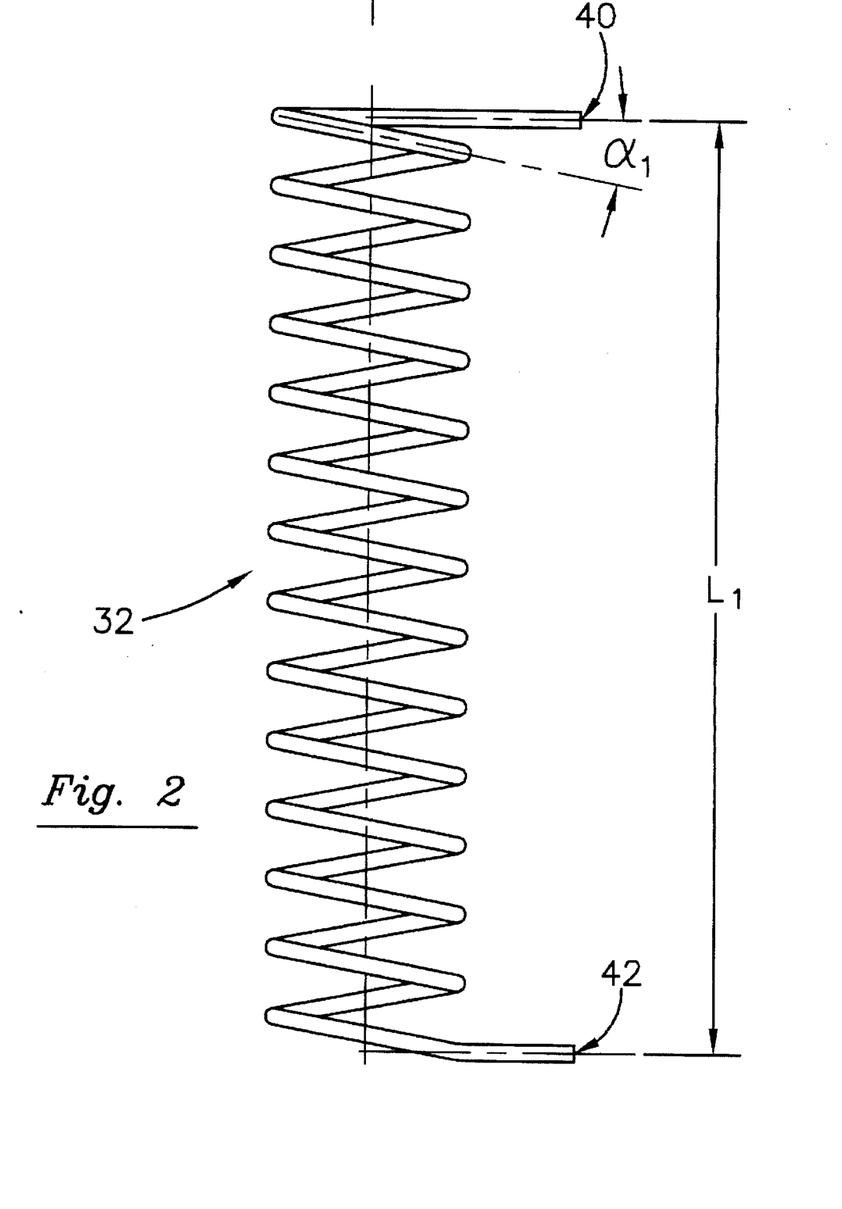
FIG. 2 shows a side view of the coiled heat exchange tube used in the back-up water heating system shown in FIG. 1.
Figure 3:
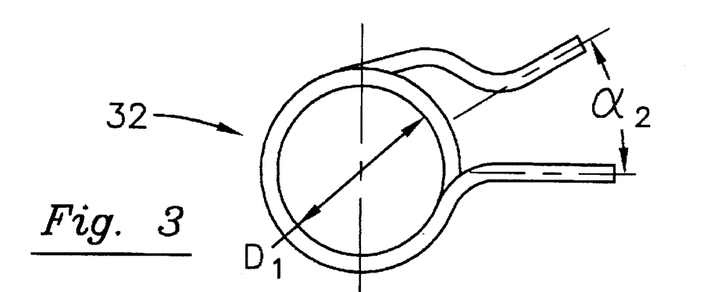
FIG. 3 shows a top view of the coiled heat exchange tube used in the back-up water heating system shown in FIG. 1.

Referring to FIG. 2, coiled heat exchange tube 32 has a plurality of coils inclined at an angle of incline $\alpha_1$. Coiled heat exchange tube 32 has an overall length $L_1$ and terminates at an inlet portion 40 and an outlet portion 42. FIG. 3 illustrates coiled heat exchange tube 32 as viewed from the top. Coiled heat exchange tube 32 has a coiled inner diameter $D_1$ larger than the diameter of flue 30 shown in FIG. 1. The inlet portion 40 and outlet portion 42 of coiled heat exchange tube 32 shown in FIG. 2 are radially separated by an angle $\alpha_2$ shown in FIG. 3.

Figure 4:
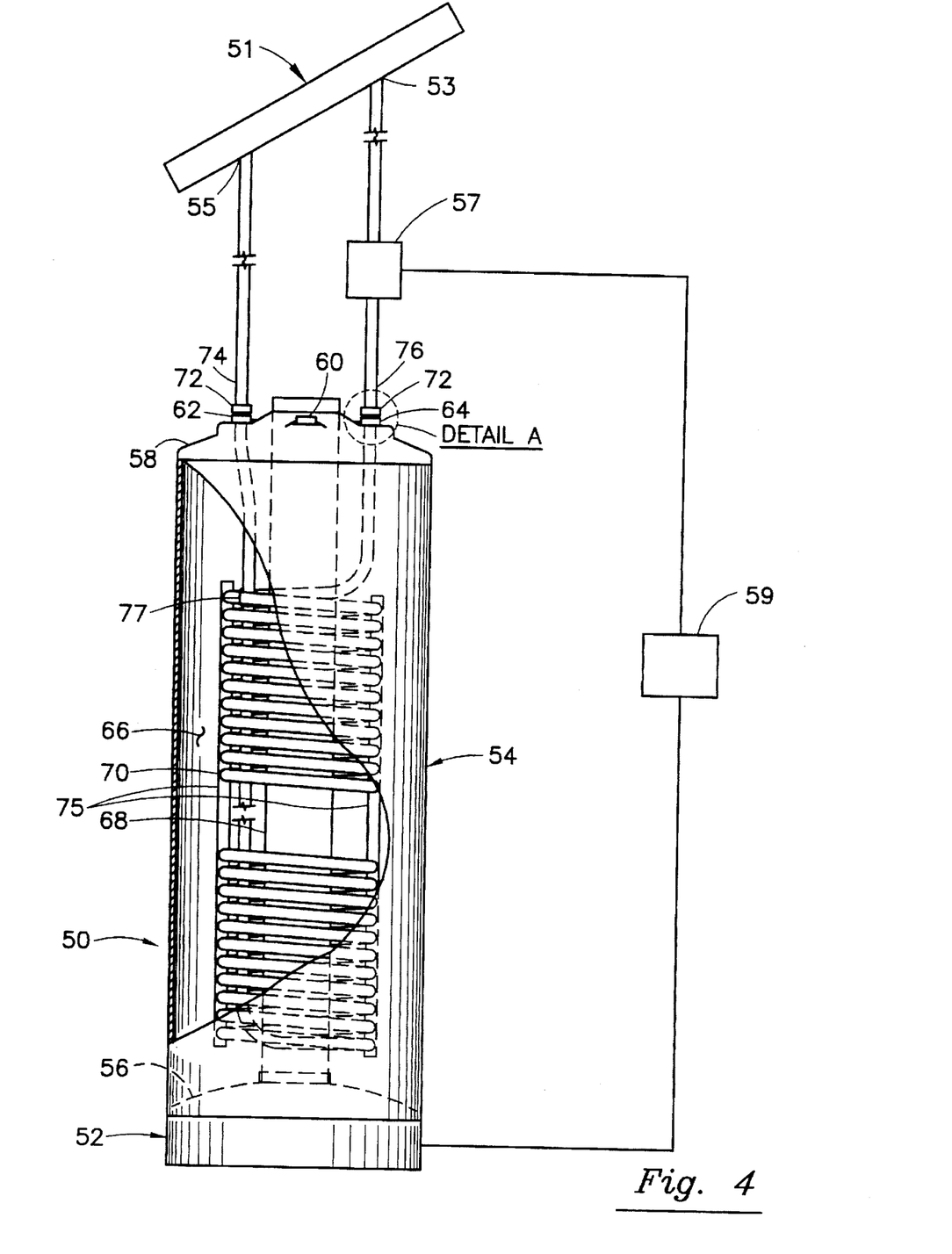
FIG. 4 shows a side view of another embodiment of the back-up water heating system with a portion of the water heater wall removed.

Referring to FIG. 4, the number 50 designates another embodiment of the back-up water heating system. Water heater system 50 has a heat source 52 positioned to heat domestic water in a glass-lined water heater 54. Water heater 54 has a bottom 56, a top 58 and a wall 66. Top 58 of water heater 54 has a hot water outlet port 60 as well as a cold water inlet port (not shown). Top 58 of water heater 54 also has a tank inlet port 64 and a tank outlet port 62. A flue 68 extends between tank bottom 56 and tank top 58 to exhaust combustion gases from heat source 52. A coiled heat exchange tube 70 surrounds flue 68, terminating at a dielectric fitting assembly 72 located at tank outlet port 62 and also terminating at a dielectric fitting assembly 72 located at tank inlet port 64.

In this embodiment of the invention, the coiled heat exchange tube 70 enters and exits water heater 54 through water heater top 58. Pipe section 76 extends from a solar heater 51 at outlet port 53 and terminates at dielectric fitting assembly 72 at tank inlet port 64. Pipe section 74 runs from dielectric fitting 72 at tank outlet port 62 and travels to an inlet port 55 on solar heater 51.

A temperature sensor 57 is provided along pipe section 76 near dielectric fitting assembly 72 at tank inlet port 64. Temperature sensor 57 is electrically connected to a water heater controller 59 which is in turn electrically connected to heat source 52. As will be described below in a description of the back-up water heating system's operation, water heater controller 59 is calibrated to actuate heat source 52 when the temperature sensed by temperature sensor 57 falls below a predetermined minimum value.

Figure 6:
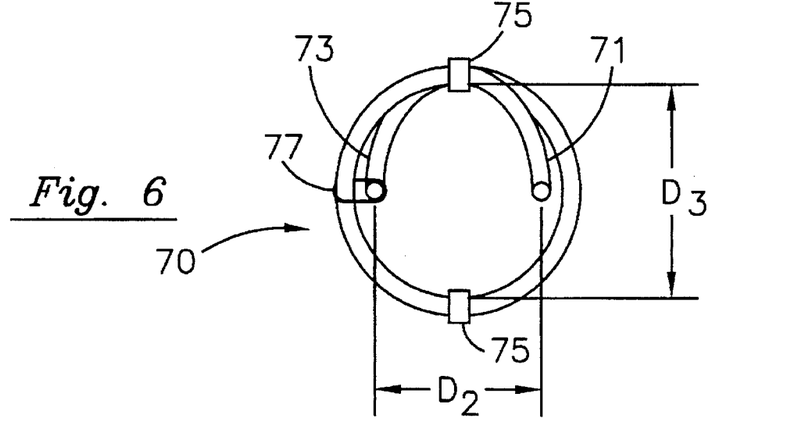
FIG. 6 shows a top view of the coiled heat exchange tube used in the back-up water heating system shown in FIG. 4.

Two coil spacing brackets 75, 75 are preferably used to engage coiled heat exchange tube 70. Coil spacing brackets 75, ideally mounted 180° apart as shown in FIG. 6, provide support for coiled heat exchange tube 70 during shipping, handling and operation of back-up water heating system 50. Coil spacing brackets 75 also maintain spacing between adjacent coils of tube 70 and reduce or eliminate any noise caused by coil vibration. Coil spacing brackets 75 also maximize heat transfer surface area by preventing contact between adjacent coils. Another benefit of coil spacing brackets 75 is improved water circulation between adjacent coils, thereby decreasing stratification by permitting horizontal water flow during water heater operation. Also, brackets 75 increase coil rigidity to assist in the tank manufacturing process.

While two coil spacing brackets 75 are shown, the use of one, three or more coil spacing brackets 75 is contemplated. Details of coil spacing brackets 75 are provided hereinafter with reference to FIG. 11.

Figure 11:
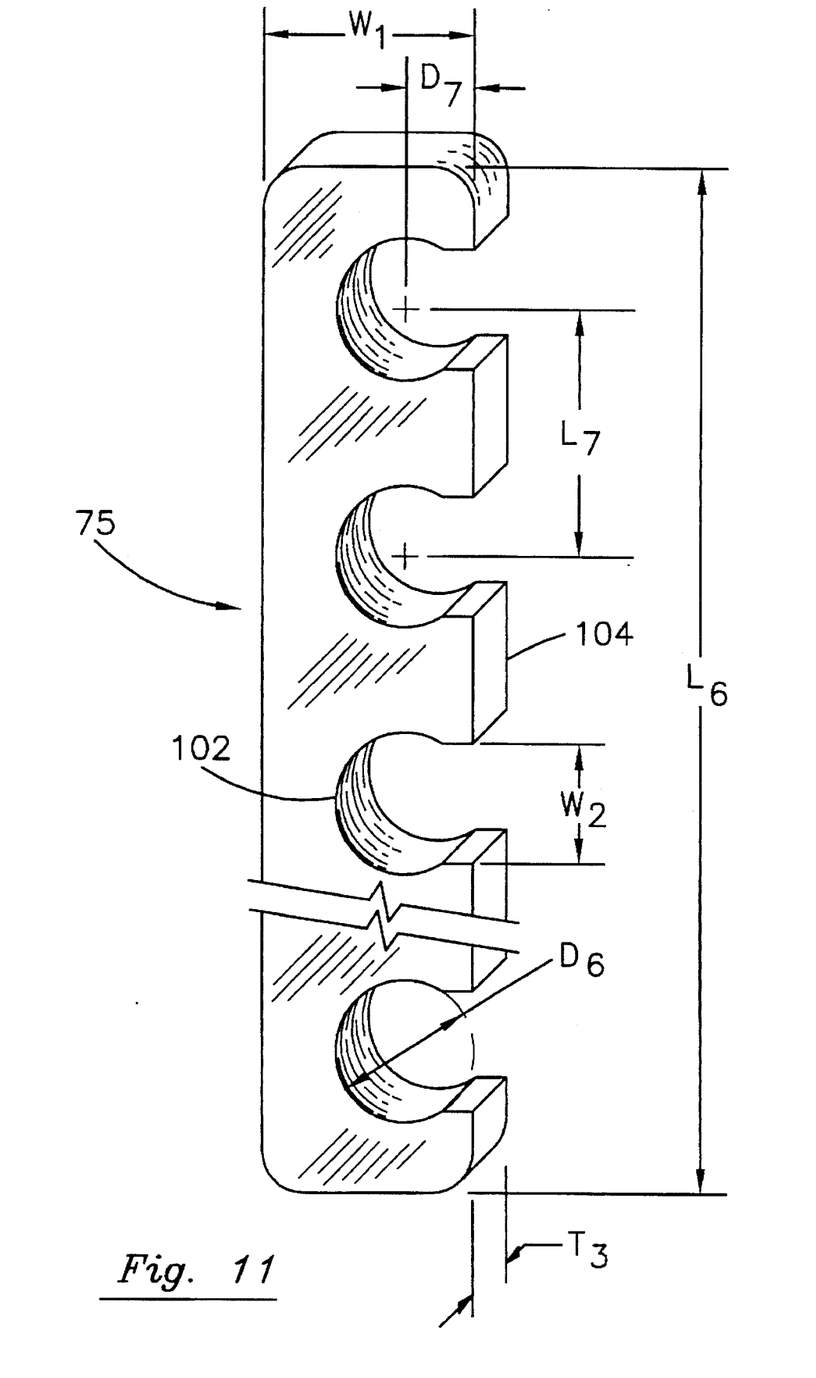
FIG. 11 shows a perspective view of the coil spacing bracket embodiment used in the back-up water heating system shown in FIG. 4.

Referring to FIG. 11, each coil spacing bracket 75 preferably has an overall length $L_6$ of approximately 21 inches, a width $W_1$ of approximately 1 inch, and a thickness $T_3$ of approximately 0.18 inches but other dimensions may be used. Coil spacing bracket 75 has coil engaging notches 102 separated and defined by spacers 104. Although outer edges of spacers 104 are shown with sharp corners, rounded surfaces are optionally provided to ease attachment to heat exchange tube 70. The number of coil engaging notches 102 in coil spacing bracket 75 preferably matches the number of coils in heat exchange tube 70.

Coil engaging notches 102 of coil spacing bracket 75 are sized and shaped to provide snap-in engagement between bracket 75 and tube 70. For example, notches 102 of bracket 75 preferably have a width $W_2$ of approximately 0.650 inches and a diameter $D_6$ of approximately 0.700 inches to permit snap-in engagement of tube 70 having outside diameter $D_5$ (FIG. 7) of about 0.665 inches.

The circular portions of notches 102 preferably have centers located a distance $D_7$ of approximately 0.400 inches from the edge of bracket 75 and are separated from each other by a length $L_7$ of approximately 0.960 inches. Bracket 75 can be provided with any dimensions that permit snap-in engagement of coiled tubing 70 or any other known means of engaging bracket 75 with tubing 70. In fact, bracket 75 can even be replaced with a strap applied around the coils of tube 70 to maintain length $L_3$ (FIG. 5), utilizing the spring effect of the coils to maintain spacing between adjacent coils. Any of the foregoing dimensions may be changed to suit.

A retaining strap 77 (shown in FIGS. 4 and 6) is preferably provided to secure the top coil of tube 70 to the leg of coiled heat exchange tube 70 which runs vertically from the bottom coil to tank outlet port 62. Retaining strap 77 assures a constant dimension $D_2$ between inlet and outlet portions 71 and 73 of coil 70 (FIG. 6). Retaining strap 77 also prevents damage to coil 70 during shipment of back-up water heating system 50.

Retaining strap 77 can be formed from a variety of materials and have a variety of dimensions. Preferably, retaining strap 77 is formed from nylon strip having a width of ⅛ inches and a thickness of 0.020 inches though various other dimensions may be used. Retaining strap 77 is preferably attached as shown in FIG. 6, but can be applied in any manner to reduce relative movement between the vertically running leg, upper coils and outlet and inlet portions of tube 70.

Figure 5:
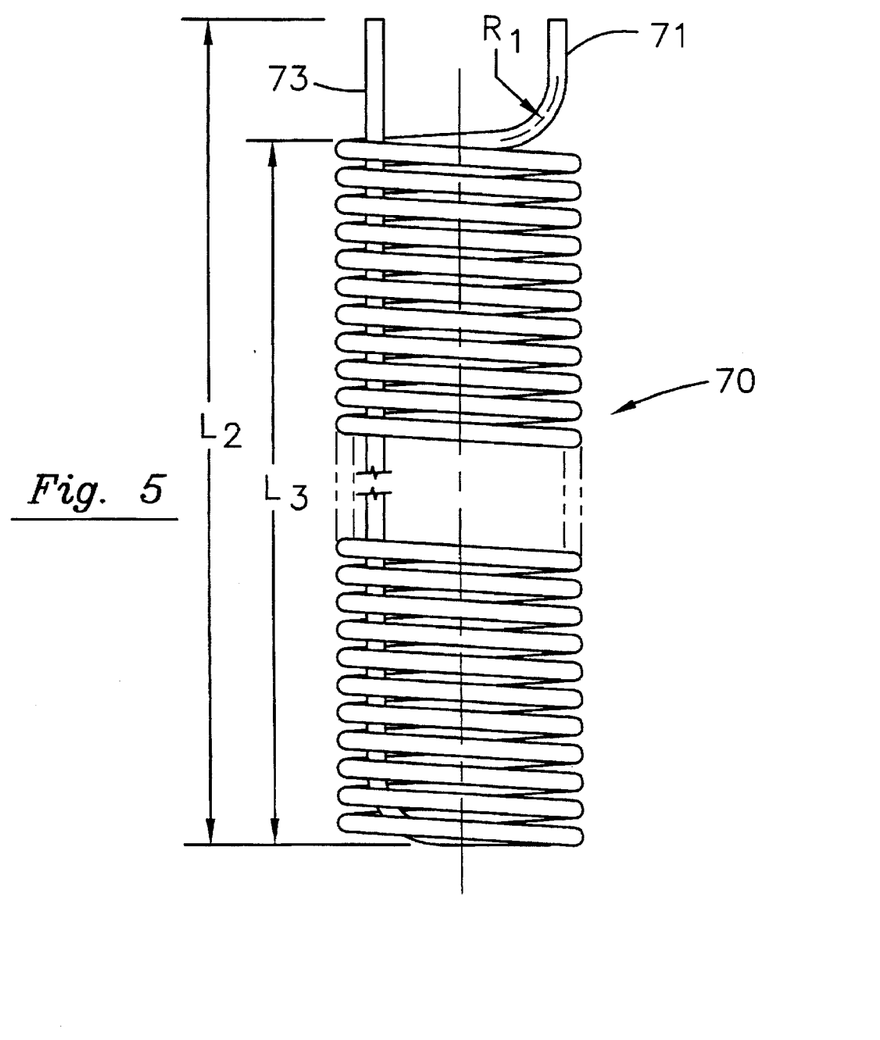
FIG. 5 shows a side view of the coiled heat exchange tube used in the back-up water heating system shown in FIG. 4.

Referring to FIG. 5, coiled heat exchange tube 70 has an overall length $L_2$ and a coiled length $L_3$. Overall length $L_2$ is preferably about 34.5 inches and coiled length $L_3$ is preferably about 25.5 inches. A bend radius $R_1$ is provided near inlet portion 71 of the coiled heat exchange tube 70 and at the bottom of outlet portion 73 of coil 70. Bend radius $R_1$ is preferably about 3 inches.

Referring to FIG. 6, distance $D_2$ between the centerlines of inlet and outlet portions 71 and 73 of coil 70 is preferably about 11 inches. Coil inner diameter $D_3$ is preferably about 12.25 inches so that flue 68 in water heating system 50 shown in FIG. 4 can easily fit within coiled heat exchange tube 70. For example, flue 68 having an outside diameter of about 5 inches can easily fit within coiled heat exchange tube 70. With the preferred dimensions provided above, the heat exchange tube will have an overall length of approximately 80 feet and coiled heat exchange tube 70 will have approximately 22.5 coils within coiled length $L_3$. This overall heat exchange tube length provides sufficient tube surface area for adequate heat transfer between recirculating fluid in coiled heat exchange tube 70 and domestic water in water heater 54.

Figure 7:
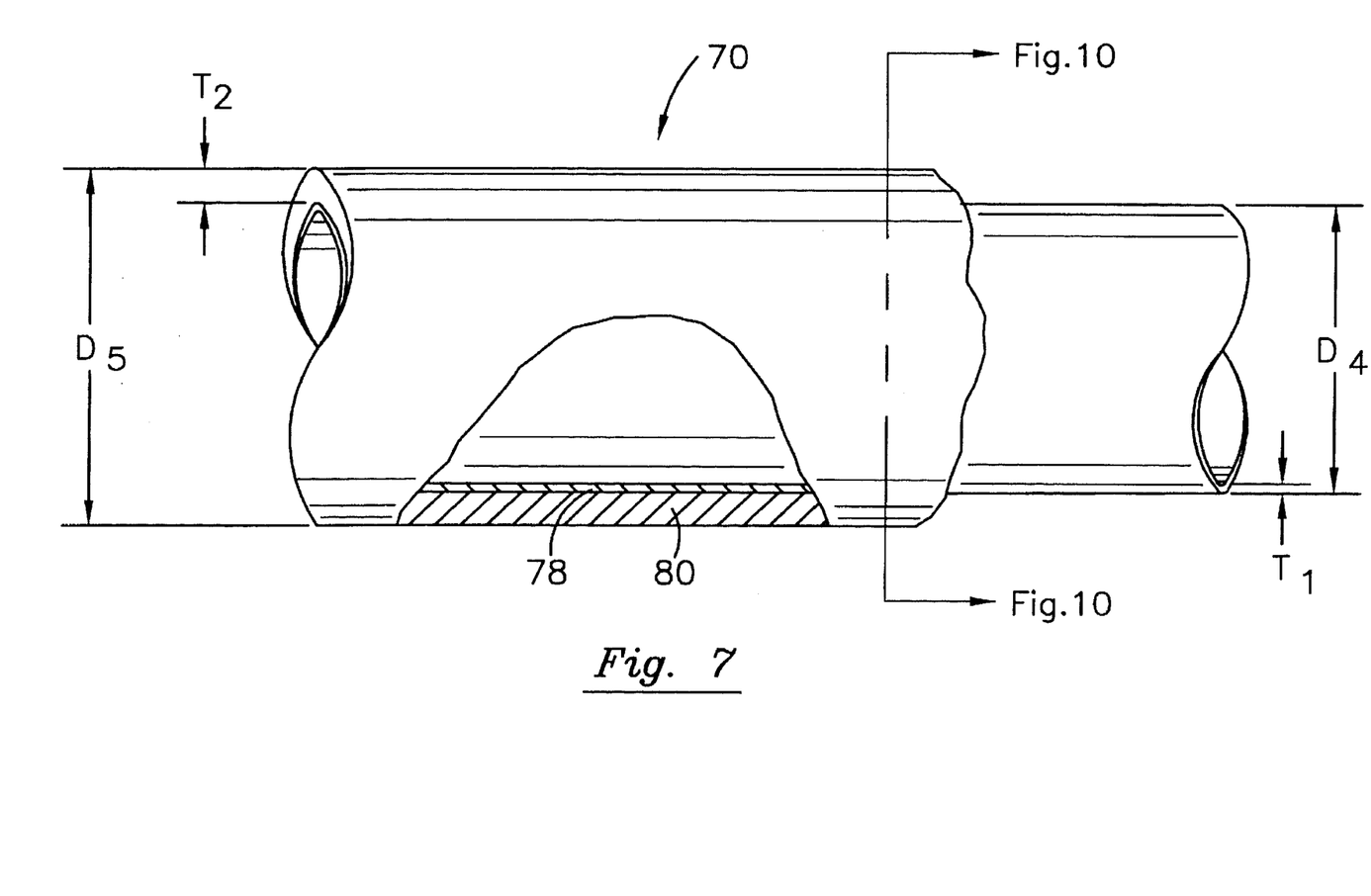
FIG. 7 shows a side view of a portion of an embodiment of the heat exchange tube with a cut-away cross-sectional view of the coiled heat exchange tube's double-wall.

FIG. 7 illustrates the preferred double-wall construction of heat exchange tube 70. Heat exchange tube 70 has a tubing inner wall 78 having an inner wall thickness $T_1$ and an inner wall outside diameter $D_4$. Tubing inner wall 78 is preferably formed from a soft metallic material such as copper or aluminum so that coiled heat exchange tube 70 is provided with a means for support to prevent kinking while being soft enough to permit the formation of coiled heat exchange tube 70 as shown in FIG. 5. Metallic tubing inner wall 78 also provides conductive heat transfer to increase the output of back-up water heating system 50. Tubing inner wall 78 preferably has thickness $T_1$ of about 0.035 inches and outside diameter $D_4$ of about 0.625 inches.

Tubing outer wall 80 fits snugly over tubing inner wall 78 and has an outer wall thickness $T_2$ and an outside diameter $D_5$. Tubing outer wall 80 is preferably formed from a non-metallic material such as high density polyethylene and may take the form of a co-extruded coating. Tubing outer wall 80 is preferably nonpermeable to oxygen to prevent oxidation of tubing inner wall 78. Wall 80 preferably has thickness $T_2$ of approximately 0.020 inches and outside diameter $D_5$ of tubing outer wall 80 is preferably about 0.665 inches.

Figure 10:
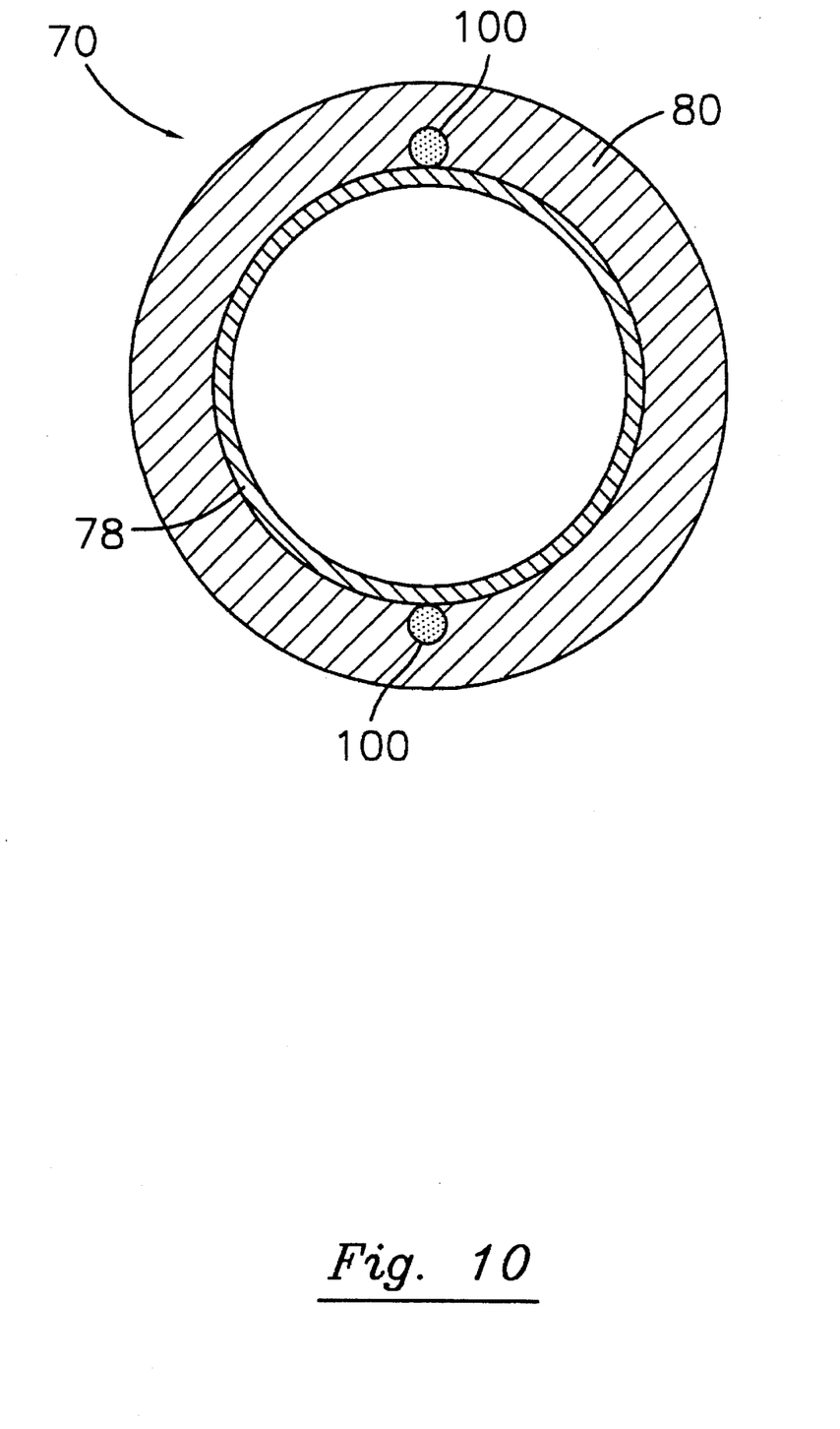
FIG. 10 shows a cross-sectional view of the coiled heat exchange tube as indicated in FIG. 7, illustrating a preferred double-wall construction.

FIG. 10 illustrates additional preferred features of heat exchange tube 70. Two monofilaments 100 are preferably placed between tubing inner and outer walls 78 and 80 of heat exchange tubing 70. Monofilaments 100 provide an improved path along which domestic water or recirculating fluid trapped between inner and outer walls 78 and 80 can travel out of the system. Monofilaments 100 can be applied axially or spirally to provide an axial or spiral water passage.

As shown in FIG. 10, two monofilaments 100 are preferably extended over the full length of heat exchange tube 70 and positioned 180° apart. Monofilaments 100 are preferably nylon thread having a diameter in the range of from about 0.009 inch to about 0.011 inch. It is apparent, however, that a thread, wire, or strip of any suitable material and having any cross-sectional shape or dimension can be used in the place of nylon monofilament 100 so long as it provides an improved leak path between inner and outer walls 78 and 80 over a substantial length of heat exchange tube 70. It is also apparent that any number of monofilaments 100 can be inserted either as outer wall 80 is extruded over inner wall 78 or by some other method, depending of course on how heat exchange tube 70 is formed.

Figure 8:
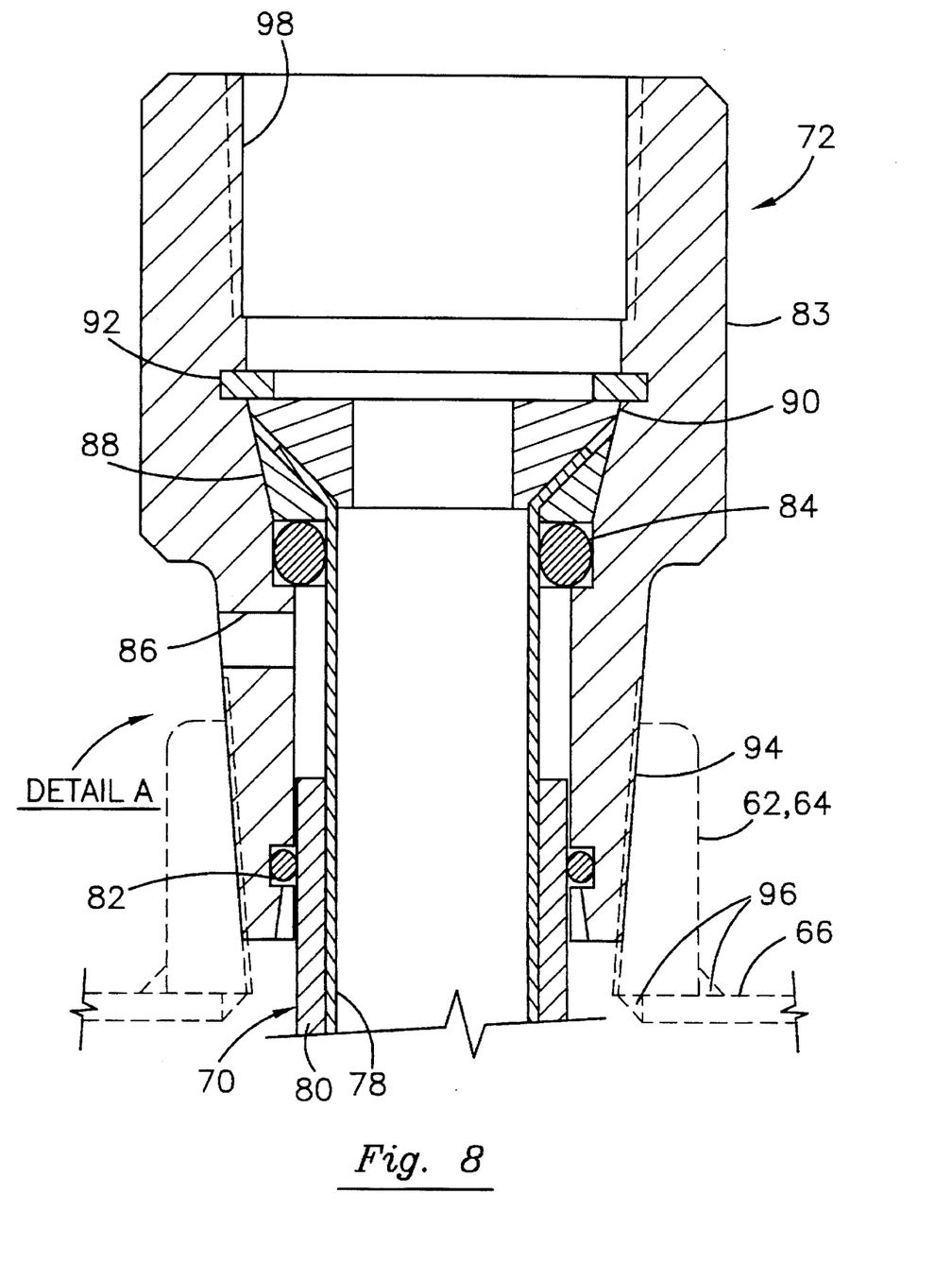
FIG. 8 shows a cross-sectional side view of an embodiment of the dielectric fitting assembly indicated by "Detail A" in FIG. 4, illustrating the termination and mounting of the coiled heat exchange tube.

FIG. 8 provides a cross-sectional view of Detail "A" of back-up water heating system 50 shown in FIG. 4. Dielectric fitting assembly 72 provides a termination for heat exchange tube 70 at tank inlet port 64 and tank outlet port 62 in water heater top 58 shown in FIG. 4. Dielectric fitting assembly 72 provides a structural mounting for coiled heat exchange tube 70 while maintaining isolation between tube inner wall 78 and wall 66 of water heater 54. An O-ring 82 captured within a groove in the steel fitting 83 provides a seal against the outside surface of outer wall 80 of heat exchange tube 70. A second O-ring 84, also captured within steel fitting 83, creates a seal around the outside surface of inner wall 78 of heat exchange tube 70. A relief hole 86 positioned between O-ring 82 and O-ring 84 provides a path for the escape of domestic water or recirculating fluid that may build-up between inner wall 78 of heat exchange tube 70 and inner surface of steel fitting 83. Relief hole 86 will also provide an escape for domestic water or recirculating fluid that travels along the passageway formed by optional monofilaments 100 captured between tubing inner and outer walls 78 and 80 (FIG. 10).

Dielectric fitting assembly 72 is preferably capable of sealing against hydrostatic pressures approaching and even exceeding 300 psi. If both inner and outer walls 78 and 80 of tube 70 leak, the pressure within water heater 54 will force domestic water into the tube and will prevent leakage of recirculating fluid into water heater 54, thereby preventing contamination of the domestic water supply.

In order to prevent axial movement of heat exchange tube 70 within steel fitting 83, there are provided two plastic spacers which capture inner wall 78 of heat exchange tube 70. A first plastic spacer 88 forms an upper end of a groove in which O-ring 84 is seated. First plastic spacer 88 also prevents movement of heat exchange tube 70 into water heater 54. A second plastic spacer 90 is positioned to prevent the axial movement of heat exchange tube 70 outward from water heater 54. The exposed end of inner wall 78 of heat exchange tube 70 terminates in a position remote from the inner surface of steel fitting 83 so as to maintain dielectric isolation. A retaining ring 92 is positioned within a groove in steel fitting 83 to capture first and second plastic spacers 88 and 90.

Male pipe threads 94 on steel fitting 83 are provided to permit sealing engagement with tank outlet and inlet ports 62 and 64, indicated with phantom lines in FIG. 8. Tank outlet and inlet ports 62 and 64 are attached to wall 66 of water heater 54 by means of welds 96. Female pipe threads 98 are provided at the opposite end of steel fitting 83 to provide for sealing connection with piping components which lead to and from the solar heater so that recirculating fluid can be circulated to and from heat exchange tube 70 mounted in water heater 54.

O-rings 82 and 84 are preferably formed from E.P.D.M. having a durometer of approximately 70. However, O-rings 82 and 84 can be any material capable of providing a pressure seal while withstanding the elevated temperatures generated in water heaters. In fact, O-rings 82 and 84 can be replaced with any known sealing means. First and second plastic spacers 88 and 90 are preferably formed from acetal copolymer, but may be formed from any other known electrically insulating material.

Figure 9:
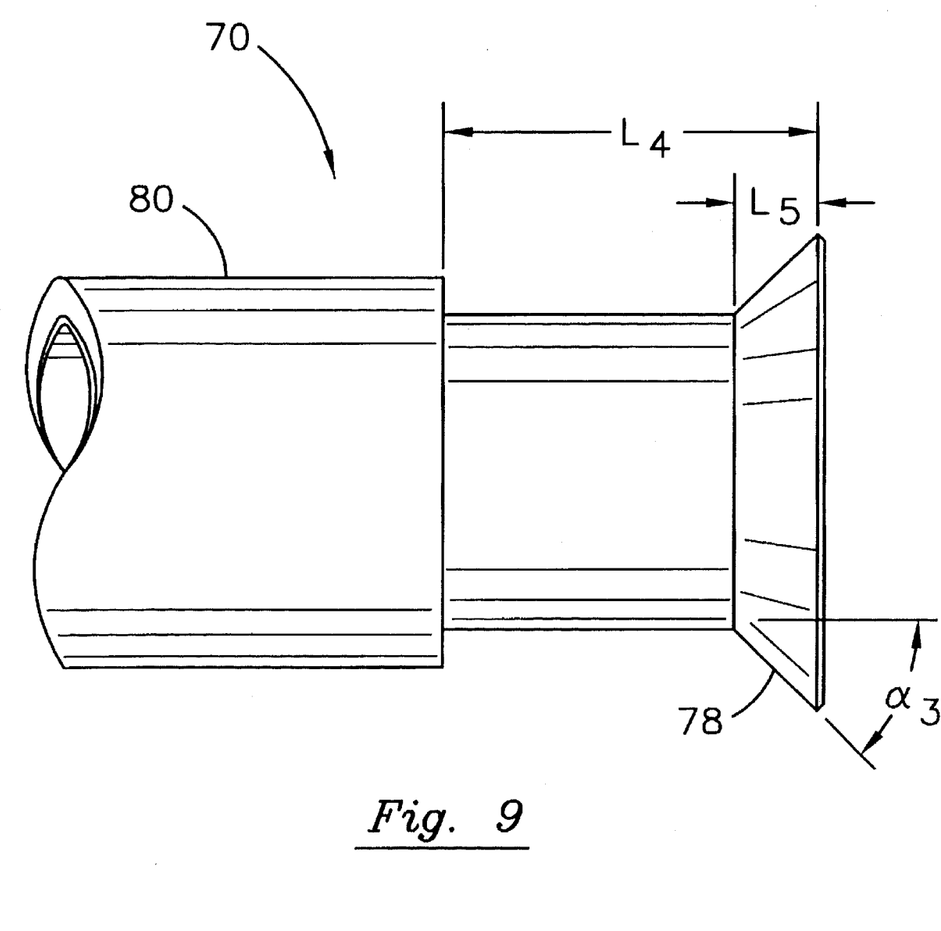
FIG. 9 shows a side view of one end of the coiled heat exchange tube shown in FIG. 7, illustrating the preparation of the coiled heat exchange tube for mounting in the dielectric fitting assembly shown in FIG. 8.

FIG. 9 illustrates the manner in which the ends of heat exchange tube 70 are prepared for mounting within dielectric fitting assembly 72 shown in FIG. 8. So that a seal can be made against inner and outer walls 78 and 80 of heat exchange tube 70, outer wall 80 is stripped from inner wall 78 for a length $L_4$. This strip length $L_4$ is preferably about 1 inch.

In order to allow for the mounting of heat exchange tube 70 within dielectric fitting assembly 72 shown in FIG. 8, the end portion of inner wall 78 must be flared so that first and second plastic spacers 88 and 90 can capture inner wall 78 to prevent axial movement. O-rings 82 and 84 are preferably installed over inner and outer walls 78 and 80 before inner wall 78 is flared. Inner wall 78 is flared over a length $L_5$ and at an angle $\alpha_3$. Flare length $L_5$ is preferably about 0.296 inches and angle $\alpha_3$ is preferably greater than about 45°.

Monofilaments 100 (not shown) are preferably trimmed flush with the trimmed edge of stripped outer wall 80. Monofilaments 100 may, however, extend beyond stripped outer wall 80 and into the annular space below O-ring 84 (FIG. 8).

Figure 12:
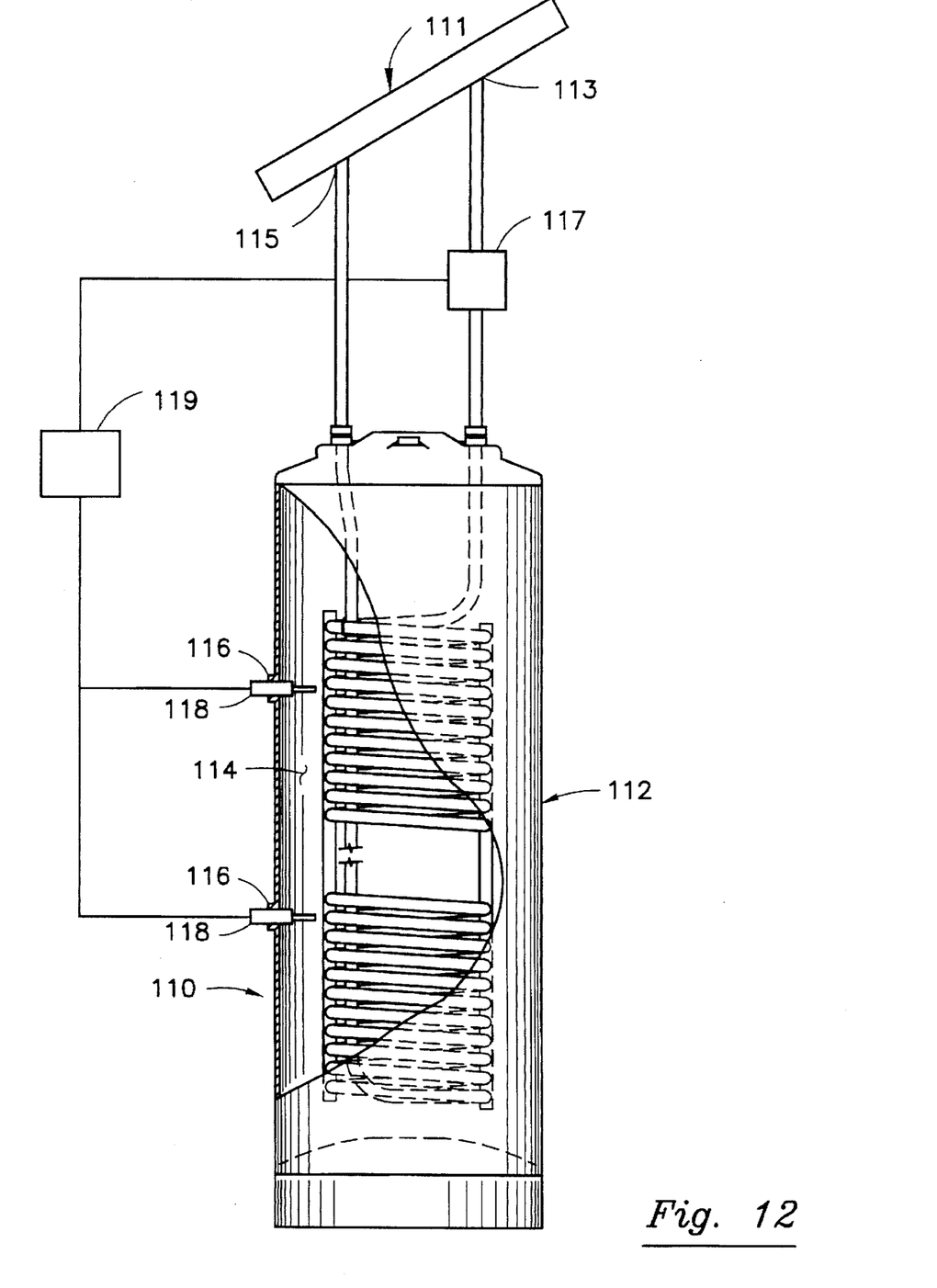
FIG. 12 shows a side view of yet another embodiment of the back-up water heating system with a portion of the water heater wall removed.

Referring to FIG. 12, the number 110 designates yet another embodiment of the back-up heating system. Water heating system 110 is similar to water heating system 50 (FIG. 4) except that system 110 utilizes electric heating rather than direct-fired heating. Water heating system 110 has a glass-lined storage tank 112 with a wall 114.

Ports 116,116 in wall 114 are provided for mounting of electric water heating elements 118,118. Although heating elements 118,118 are shown at ports 116,116 in wall 114, ports 116,116 and elements 118,118 can be located at any other surface or combination of surfaces of tank 112. Similarly, any number of heating elements 118 can be provided, depending on the location of heating elements 118 and the required heat supply.

A temperature sensor 117 is provided near the inlet of water heater 112 to sense the temperature of recirculating fluid from solar heater 111 as it enters water heater 112. Temperature sensor 117 is electrically connected to a water heater controller 119 which is in turn electrically connected to electrical heating elements 118, 118. Water heater controller 119 is calibrated to actuate electrical heating elements 118,118 when the temperature sensed by temperature sensor 117 drops below a predetermined minimum.

Referring to FIGS. 1, 4 and 12, the operation of back-up heating systems 10, 50 and 110 will now be described. It is important to note that, although a glycol and water mixture is preferably circulated through the solar heater circuit, any fluid or refrigerant can be used. In the embodiment of the back-up water heating system shown in FIG. 1, fluid from solar heater 11 enters water heater 14 through piping 36, dielectric fitting assembly 34, and inlet port 26. The fluid travels downwardly through coiled heat exchange tube 32 as it transfers heat to domestic water within water heater 14. The fluid then exits water heater 14 through an outlet port 28 and dielectric fitting assembly 34 and travels to solar heater 11 through piping 38. This fluid is continuously circulated through back-up water heating system 10 as needed.

The heat transferred from hot recirculating fluid in heat exchange coil 32 heats domestic water in water heater 14 for domestic consumption. Accordingly, under normal operational conditions, solar heater 11 is the sole and primary domestic water heat source. However, when solar power generated by solar heater 11 cannot sufficiently heat the recirculating fluid to a predetermined minimum temperature, temperature sensor 17 senses the temperature drop and water heater controller 19 actuates heat source 12 which acts as a back-up heat source. Thereafter, back-up heating system 10 operates as a standard direct-fired gas water heater, at least until the temperature sensed by temperature sensor 17 rises above the predetermined minimum temperature at which time heat source 12 is deactivated. Accordingly, solar heater 11 is the primary heat source and heat source 12 is a back-up or auxiliary heat source.

Referring to FIG. 4, heated recirculating fluid from solar heater 51 enters heat exchange tube 70 in water heater 54 through pipe section 76, dielectric fitting assembly 72, and inlet port 64. The fluid travels downwardly toward bottom 56 of water heater 54 through coiled heat exchange tube 70. The domestic water within water heater 54 is heated by heat transferred from the hot recirculating fluid in tube 70. The fluid then exits through top 58 of water heater 54 by passing through dielectric fitting assembly 72 mounted at tank outlet port 62. The fluid then travels toward solar heater 51 through pipe section 74.

Back-up water heating system 50 operates in the same manner as system 10. Specifically, recirculating fluid is heated by solar heater 51 and is then recirculated through heat exchange coil 70 in water heater 54. Heat transfer from the hot recirculating fluid heats domestic water in water heater 54 for domestic consumption. The recirculating fluid is then passed back through solar heater 51 for reheating. When the temperature sensed by temperature sensor 57 falls below a predetermined minimum, water heater controller 59 actuates heat source 52 to provide a back-up heat source for the domestic water.

Referring to FIG. 12, back-up water heating system 110 operates in a manner similar to that of systems 10 and 50 except that electric heating elements 118, 118 replace the direct-fired heat sources and flues. Recirculating fluid is heated by solar heater 111 after which it circulates through the heat exchange coil in water heater 112 to transfer heat to domestic water. When the temperature sensed by temperature sensor 117 falls below the predetermined minimum, water heater controller 119 actuates electric heating elements 118,118 to act as back-up heaters for the domestic water.

It is preferred in the back-up heating system according to this invention that the primary domestic water heat source is the solar heater and the back-up heat source is the water heater heat source. Accordingly, in normal operational conditions, domestic water within the water heater will be heated solely via heat transfer from solar-heated recirculating fluid in the coiled heat exchange tube. The recirculating fluid is continuously reheated as it is circulated back through the solar heater.

When the solar heater cannot heat the recirculating fluid sufficiently to heat the domestic water supply, the back-up heat source in the water heater will supply heated domestic water sufficient to satisfy domestic needs. Specifically, when the solar heater is limited in capacity by inclement weather or lack of sunlight, the direct-fired burner or heating elements of the water heater will be actuated to heat the domestic water supply acting alone or as a supplement to the solar heater.

The temperature sensor will detect a drop in recirculating fluid temperature below a predetermined minimum capable of heating the domestic water supply. When the minimum temperature is detected, the controller actuates the back-up heat source. Also, the controller can be connected to a valve in the recirculating fluid conduit to close the conduit and discontinue circulation of the fluid until the minimum temperature is again exceeded. Such a valve is especially preferable where continued recirculation of fluid below the minimum temperature would result in system heat loss rather than domestic water heating. The controller and temperature sensor are also optionally combined and mounted on the tank exterior for direct or indirect water or fluid temperature sensing.

It is of course contemplated that the back-up heating system can be reversed so that the water heater heat source can act as a primary heat source with the solar heater acting as a back-up or supplemental heat source. Such a back-up water heating system may be appropriate in climates where solar energy may be insufficient to provide continuous hot domestic water needs but may at times be sufficient to supplement the water heater heat source. Specifically, a valve in the recirculating fluid conduit can be normally closed, only to be opened when a minimum temperature is sensed. A controller can be calibrated to open the valve and deactivate the water heater heat source when that minimum temperature is achieved so that solar heated recirculating fluid can be recirculated to heat domestic water in the water heater. The solar heated recirculating fluid can also be used to supplement the water heater heat source.

In any embodiment, the back-up water heating system according to this invention confers many significant benefits. First, the back-up water heating system provides an economical and durable appliance for use in both residential and commercial applications. The back-up water heating system provides hot domestic water for consumption by means of a primary heat source and a back-up heat source when the primary heat source is insufficient. The back-up water heating system can be provided with standard glass-lined water heaters without compromising the longevity of the water heaters. Also, the system provides heat to domestic water from inexpensive solar power without exclusive dependency on the sun.

The heat transfer function of the water heating system is made possible by using a heat exchange tube having a double-wall construction. The outer wall of the coiled heat exchange tube when mounted in a dielectric fitting provides dielectric isolation, thereby preventing the accelerated corrosion associated with the exposure of dissimilar metals to water within water storage tanks. The inner wall is formed from a soft metallic material which provides strength and structure to the coiled heat exchange tube while providing increased conductivity for improved heat exchange and malleability to facilitate coil formation.

The back-up water heating system confers these benefits in any embodiment, and various modifications to the overall system or its various components can be made without reaching beyond the scope of this invention. For example, the tank inlet and outlet ports at which the coiled heat exchange tube terminates can be formed in the wall of a glass-lined water heater, in the top of a water heater, through the bottom of the water heater, or in any combination of the water heater surfaces. Fluid may enter the coiled heat exchange tube near the bottom of the water heater instead of near the top. The back-up water heating system can be used in a water heater using a direct-firing burner or in an electric water heater without a flue, and the number of coils formed in the coiled heat exchange tube may be varied depending on the water heater capacity.

The double-wall heat exchange tube is preferably formed with a nonmetallic coating such as high density polyethylene, but can be formed from many other materials, including but not limited to polyethylene and polypropylene. The inner wall is preferably formed from a malleable metallic material such as aluminum or copper, but may optionally be formed from any other suitable material, including but not limited to carbon and stainless steel. The outer wall may optionally be co-extruded over the inner wall so as to maintain a uniform fit between the heat exchange tube's outer and inner walls. The outer wall may optionally be applied by employing materials such as heat shrink tubing. The outer wall may also be applied by means of a heat fit process wherein the outer wall is heated to cause its expansion, and the inner wall is placed within the outer wall so that, when the outer wall cools and contracts, there remains a close fit between the inner and outer walls.

No matter how the outer wall is applied to the inner wall, it is preferable that a path remains between the walls to permit the drainage of trapped liquid. To ensure that such a path remains between the walls, one or more monofilaments, strips or wires may optionally be inserted in an axial, spiral or some other orientation between the walls. Such monofilaments provide an improved leak path while maintaining substantially continuous contact between the tubing inner and outer walls. Such contact is important to maintain adequate heat transfer characteristics.

The back-up water heating system also optionally includes one or more stabilizer brackets to keep the heat exchange tube centered in the water heater tank. Such brackets help locate the tubing ends during manufacturing and prevent tubing damage when the tank is rolled. Also, the water heaters used in the back-up water heating system include many standard components, including an outer jacket, a dip tube, a sacrificial anode and other components.

The dimensions of the coiled heat exchange tube may vary depending on practical considerations. For example, an increase in the diameter of the coiled heat exchange tube will increase the surface area over which heat exchange may occur. Similarly, the wall thickness of the inner and outer walls can be increased or decreased to facilitate the co-extrusion and coiling processes, and when a nonmetallic, nonconductive material is used to form the outer wall, the thickness of the outer wall may be reduced to decrease its insulative effect. The thickness of the inner wall must be sufficient to avoid kinking of the heat exchange tube during the coiling process, and must be suitable to maintain the shape of a finally coiled heat exchange tube.

The dielectric fitting assembly may be structured in any way capable of maintaining dielectric isolation between the metallic inner wall of the heat exchange tube and the inside surface of the steel fitting, and the heat exchange tube can be mounted within the dielectric fitting assembly in any way which prevents substantial axial movement of the heat exchange tube within the dielectric fitting assembly. A plastic fitting may optionally be used to provide dielectric isolation between the metallic inner wall of the heat exchange tube and the inlet and outlet ports of the water heater.

The nature of the primary and back-up heat sources can also be varied within the scope of this invention. For example, although the back-up heat source in the water heater is preferably a gas-fired burner, it is also contemplated that the back-up heat source could be an oil-fired burner, electrical heating elements, or any other known heat source. Similarly, the primary heat source is preferably solar power but may also be a combustible fuel burner, an electrical heat source, or any other known heat source. The optimal primary and back-up heat sources may depend upon available fuel sources, climate where the system is being used, and consumer preference.

The recirculating fluid circulates through the recirculating fluid conduit assisted by convection currents and other natural phenomenon. However, it is also contemplated that a pump and valve system may also be used to assure proper fluid circulation and flow rate.

These and other modifications to the back-up water heating system can be made without exceeding the scope and spirit of this invention. The scope of this invention is separately defined in the following claims.

What is claim is:

1. Apparatus for heating a domestic water supply comprising:

a storage tank having a metallic outer wall and a glass lining adapted to contain said domestic water supply;

a combustible fuel burner positioned to heat said domestic water supply within said storage tank;

a solar heating tube connected to supply solar heated fluid;

a heat transfer coil mounted within said storage tank and connected to said solar heating tube, said heat transfer coil having a double-wall comprising a non-metallic outer wall in contact with a metallic inner wall, said double-wall being sealed to prevent mixing of said domestic water supply and said solar heated fluid, said metallic inner wall of said double-wall being electrically isolated from said metallic outer wall of said storage tank;

a sensor positioned to sense the temperature of said solar heated fluid as delivered to said heat transfer coil; and a controller connected to said sensor and to said combustible fuel burner, said controller being attached to actuate said combustible fuel burner to heat said domestic water supply when said temperature of said solar heated fluid is insufficient to heat said domestic water supply by heat transfer between said solar heated fluid in said heat transfer coil and said domestic water supply in said storage tank.

2. The apparatus described in claim 1, wherein said metallic inner wall of said heat transfer coil is formed from a material selected from the group consisting of aluminum, copper, stainless steel, and carbon steel.

3. The apparatus described in claim 1, wherein said non-metallic outer wall of said heat transfer coil is formed from a material selected from the group consisting of polyethylene, polypropylene, and high density polyethylene.

4. The apparatus described in claim 1, wherein said storage tank has a flue and said heat transfer coil is coiled about said flue.

5. The apparatus described in claim 1, wherein said heat transfer coil terminates at a wall of said storage tank.

6. The apparatus described in claim 1, wherein said heat transfer coil terminates in a top of said storage tank.

7. The apparatus described in claim 1, wherein means is positioned between said non-metallic outer wall and said metallic inner wall of said heat transfer coil to form a path along which any of said domestic water supply that may leak through said outer wall, and any of said solar heated fluid that may leak through said inner wall, can travel out of said storage tank.

8. The apparatus described in claim 7, wherein said means positioned between said non-metallic outer wall and said metallic inner wall includes at least one elongated member selected from a group consisting of a monofilament, a thread, a wire, and a strip.

9. The apparatus described in claim 1, further comprising a support member contacting coils of said heat transfer coil and attached to reduce relative movement of said coils.

10. The apparatus described in claim 9, wherein said support member is a coil spacing bracket shaped for snap-on attachment to said coils.

11. Apparatus for heating a domestic water supply comprising:

a glass-lined storage tank adapted to contain said domestic water supply;

a combustible fuel burner positioned to heat said domestic water supply within said glass-lined storage tank;

a solar heating tube connected to supply solar heated fluid;

a heat transfer coil mounted within said glass-lined storage tank and connected to said solar heating tube, said heat transfer coil having a double-wall comprising a non-metallic outer wall in contact with a metallic inner wall, said double-wall being sealed to prevent mixing of said domestic water supply and said solar heated fluid, wherein at least one elongated member is captured between said non-metallic outer wall and said metallic inner wall to form a path along which any of said domestic water supply that may leak through said outer wall, and any of said solar heated fluid that may leak through said inner wall, can travel out of said glass-lined storage tank;

a sensor positioned to sense the temperature of said solar heated fluid as delivered to said heat transfer coil; and a controller connected to said sensor and to said combustible fuel burner, said controller being attached to actuate said combustible fuel burner to heat said domestic water supply when said temperature of said solar heated fluid is insufficient to heat said domestic water supply by heat transfer between said solar heated fluid in said heat transfer coil and said domestic water supply in said glass-lined storage tank.

12. The apparatus described in claim 11, wherein said at least one elongated member is selected from a group consisting of a monofilament, a thread, a wire, and a strip.

* * * * *